United States Patent
Lovelace

(10) Patent No.: US 10,259,447 B2
(45) Date of Patent: Apr. 16, 2019

(54) DYNAMIC HYBRID VEHICLE SYSTEM FOR STABILIZING CYLINDER DEACTIVATION OR TURBOCHARGER BOOSTING

(71) Applicant: XL Hybrids, Boston, MA (US)

(72) Inventor: Edward Lovelace, Boston, MA (US)

(73) Assignee: XL Hybrids, Boston, MA (US)

( * ) Notice: Subject to any disclaimer, the term of this patent is extended or adjusted under 35 U.S.C. 154(b) by 0 days.

(21) Appl. No.: 15/922,698

(22) Filed: Mar. 15, 2018

(65) Prior Publication Data

US 2018/0265074 A1    Sep. 20, 2018

Related U.S. Application Data

(60) Provisional application No. 62/472,501, filed on Mar. 16, 2017.

(51) Int. Cl.
| | |
|---|---|
| B60W 20/15 | (2016.01) |
| B60K 6/485 | (2007.10) |
| F02B 37/12 | (2006.01) |
| B60W 20/40 | (2016.01) |
| B60W 30/182 | (2012.01) |
| F02D 17/02 | (2006.01) |
| F02D 23/00 | (2006.01) |
| F02D 41/00 | (2006.01) |

(52) U.S. Cl.
CPC ............ *B60W 20/15* (2016.01); *B60K 6/485* (2013.01); *B60W 20/40* (2013.01); *B60W 30/182* (2013.01); *F02B 37/12* (2013.01); *F02D 17/02* (2013.01); *F02D 23/00* (2013.01); *F02D 41/0087* (2013.01); *B60W 2520/105* (2013.01); *F02D 2200/0625* (2013.01); *F02D 2200/501* (2013.01); *F02D 2200/606* (2013.01)

(58) Field of Classification Search
CPC ......... B60W 20/15; B60K 6/485; F02B 37/12
See application file for complete search history.

(56) References Cited

U.S. PATENT DOCUMENTS

| | | | |
|---|---|---|---|
| 2011/0190971 A1* | 8/2011 | Severinsky | B60H 1/004 701/22 |
| 2018/0099658 A1* | 4/2018 | Ossareh | B60W 20/13 |

OTHER PUBLICATIONS

Automotive News, "Ford, GM take opposite routes to engine fuel economy," Jan. 6, 2014, 6 pages.

* cited by examiner

*Primary Examiner* — Basil T. Jos
(74) *Attorney, Agent, or Firm* — Fish & Richardson P.C.

(57) ABSTRACT

A computing device-implemented method includes receiving data representative of one or more operational parameters for a vehicle, calculating the fuel rate required for an internal combustion engine of the vehicle to respond to the operational parameters, determining if the required fuel rate exceeds a threshold which would cause a state change in the performance of the internal combustion engine, if the required fuel rate exceeds the threshold, calculating an amount of assistance required for an electric hybrid traction motor to provide to a drivetrain of the vehicle to implement the received operational parameters of the vehicle, and providing the amount of assistance to the drivetrain of the vehicle, thereby preventing the state change in the performance of the internal combustion engine.

15 Claims, 9 Drawing Sheets

DYNAMIC HYBRID VEHICLE SYSTEM FOR STABILIZING CYLINDER DEACTIVATION OR TURBOCHARGER BOOSTING

RELATED APPLICATION

The present application claims priority to U.S. Provisional Patent Application Ser. No. 62/472,501, filed on Mar. 16, 2017, entitled "DYNAMIC HYBRID VEHICLE SYSTEM FOR STABILIZING CYLINDER DEACTIVATION," which application is incorporated herein by reference in its entirety.

BACKGROUND

This description relates to techniques for controlling hybrid vehicle performance with cylinder deactivation or turbocharger boosting of the internal combustion engine.

With the increased interest in reducing dependency on fossil fuels, the use of alternative energy sources has been incorporated into various applications including transportation. Both public and private transportation vehicles have been developed to run on a fuel other than traditional petroleum based fuels (i.e., petrol, diesel, etc.). Some vehicles solely use alternative energy sources while others combine the functionality of petroleum based systems with alternative energy based systems (e.g., electrical, biofuel, natural gas, etc.). Along with being potentially more cost-effective and having more abundant resources, such alternative energy sources and their byproducts are considered to be more environmentally friendly.

SUMMARY

The systems and techniques described herein relate to cylinder activation or deactivation in an internal combustion engine which is part of a hybrid electric vehicle system. Frequent cycling between full and reduced cylinder configurations in response to varying engine load results in reduced fuel savings and may not take advantage of the hybrid powertrain present in the vehicle. As described, the system couples cylinder deactivation with an electric traction motor hybrid electric vehicle (HEV) source so that the electric traction motor modulates power to keep the cylinders deactivated until a high threshold load is reached. Keeping cylinders deactivated reduces the number of times that additional cylinders are activated, and reduces the number of times that the engine and powertrain change between full and reduced cylinder operations, resulting in improved fuel economy. This enhancement could, for example, enable highway driving with cylinders deactivated for the entire highway drive.

The systems and techniques described herein also relate to turbocharger activation or deactivation in an internal combustion engine which is part of a hybrid electric vehicle system. Frequent cycling between boosted engine and normal performance due to turbocharger air injection in response to varying engine load results in reduced fuel savings and may not take advantage of the hybrid powertrain present in the vehicle. As described, the system couples turbocharger activation with an electric traction motor hybrid electric vehicle (HEV) source so that the electric traction motor modulates power to keep the engine cylinders in a non-boosted state until a high threshold load is reached. Keeping cylinders largely non-boosted reduces the number of times that turbochargers are activated, and reduces the number of times that the engine and powertrain change between normal and boosted operations, resulting in improved fuel economy.

In one aspect, a computing device-implemented method includes receiving data representative of one or more operational parameters for a vehicle, calculating the fuel rate required for an internal combustion engine of the vehicle to respond to the operational parameters, determining if the required fuel rate exceeds a threshold which would cause a state change in the performance of the internal combustion engine, if the required fuel rate exceeds the threshold, calculating an amount of assistance required for an electric hybrid traction motor to provide to a drivetrain of the vehicle to implement the received operational parameters of the vehicle, and providing the amount of assistance to the drivetrain of the vehicle, thereby preventing the state change in the performance of the internal combustion engine.

Implementations may include any or all of the following features. The state change is activation of a subset of cylinders present in the internal combustion engine which are in a deactivated state. The state change is activating a turbocharger to increase an amount of air delivered to cylinders present in the internal combustion engine. At least one of the one or more operational parameters represents a speed of the vehicle. At least one of the one or more operational parameters represents an acceleration of the vehicle. The data is received from one or more sensors located in the vehicle. The electric hybrid traction motor converts electrical power to mechanical power.

In one aspect, a system comprises a computing device comprising a memory configured to store instructions; and a processor to execute the instructions to perform operations comprising, receiving data representative of one or more operational parameters for a vehicle, calculating the fuel rate required for an internal combustion engine of the vehicle to respond to the operational parameters, determining if the required fuel rate exceeds a threshold which would cause a state change in the performance of the internal combustion engine, if the required fuel rate exceeds the threshold, calculating an amount of assistance required for an electric hybrid traction motor to provide to a drivetrain of the vehicle to implement the received operational parameters of the vehicle; and providing the amount of assistance to the drivetrain of the vehicle, thereby preventing the state change in the performance of the internal combustion engine.

Implementations may include any or all of the following features. The state change is activation of a subset of cylinders present in the internal combustion engine which are in a deactivated state. The state change is activating a turbocharger to increase an amount of air delivered to cylinders present in the internal combustion engine. At least one of the one or more operational parameters represents a speed of the vehicle. At least one of the one or more operational parameters represents an acceleration of the vehicle. The data is received from one or more sensors located in the vehicle. The electric hybrid traction motor converts electrical power to mechanical power.

In one aspect, one or more computer readable non-transitory media storing instructions that are executable by a processing device, and upon such execution cause the processing device to perform operations comprising receiving data representative of one or more operational parameters for a vehicle, calculating the fuel rate required for an internal combustion engine of the vehicle to respond to the operational parameters, determining if the required fuel rate exceeds a threshold which would cause a state change in the performance of the internal combustion engine, if the required fuel rate exceeds the threshold, calculating an amount of assistance required for an electric hybrid traction motor to provide to a drivetrain of the vehicle to implement the received operational parameters of the vehicle; and providing the amount of assistance to the drivetrain of the vehicle, thereby preventing the state change in the performance of the internal combustion engine.

Implementations may include any or all of the following features. The state change is activation of a subset of cylinders present in the internal combustion engine which are in a deactivated state. The state change is activating a turbocharger to increase an amount of air delivered to cylinders present in the internal combustion engine. At least one of the one or more operational parameters represents a speed of the vehicle. At least one of the one or more operational parameters represents an acceleration of the vehicle. The data is received from one or more sensors located in the vehicle. The electric hybrid traction motor converts electrical power to mechanical power.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
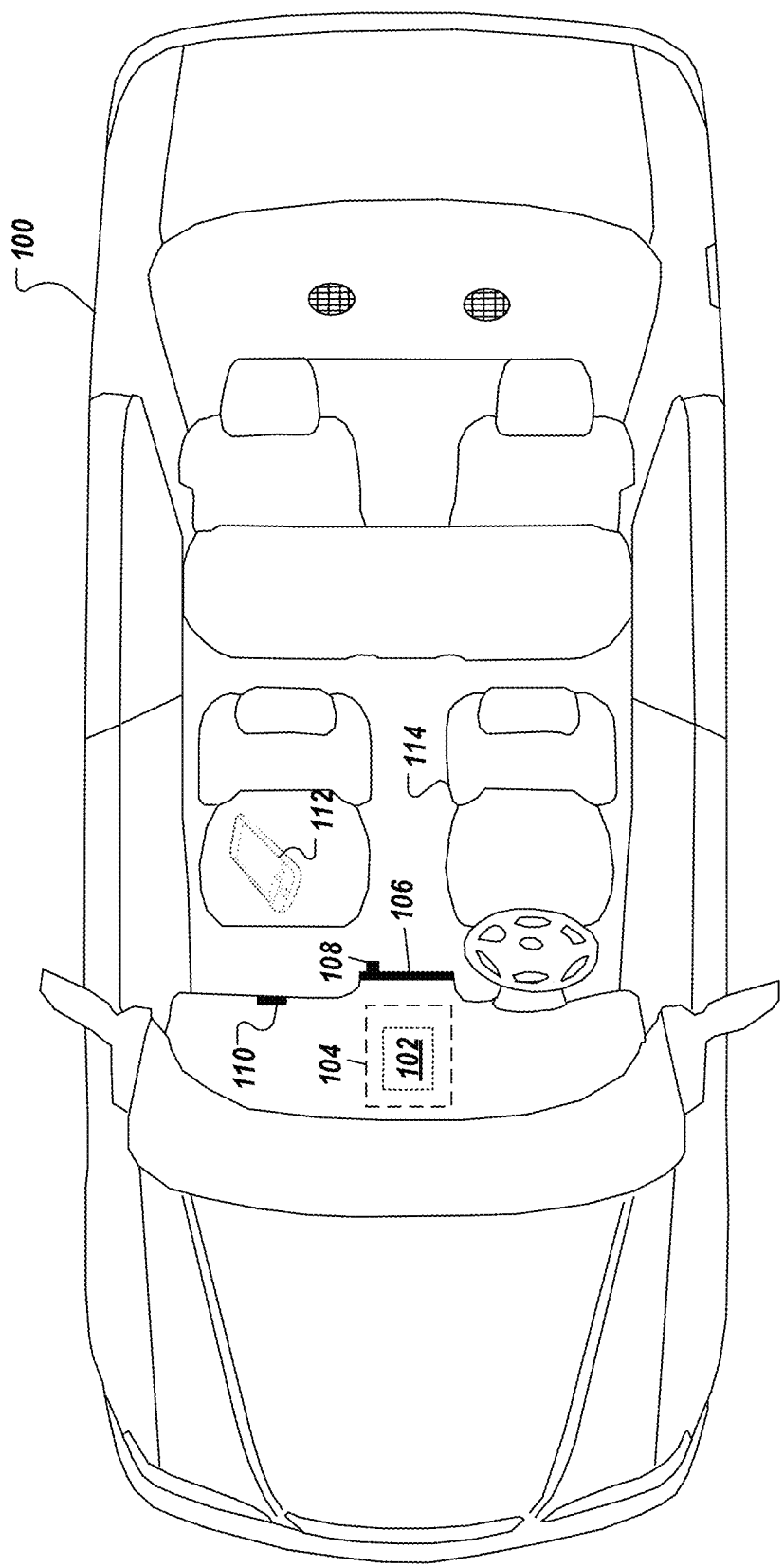
FIG. 1 illustrates a vehicle that includes a vehicle information manager.

Alternative fuel vehicles may solely rely upon non-petroleum energy sources, such as electricity, natural gas, biofuels etc. Rather than sole reliance on such energy sources, alternative fuel vehicles may also rely partially on an internal combustion engine along with one or more alternative energy sources. For example, a vehicle (referred to as a hybrid vehicle) may use two or more distinct power sources, such as an electric motor and an internal combustion engine (referred to as a hybrid electric vehicle (HEV)). Some hybrid vehicles (referred to as plug-in hybrid vehicles) may operate by using energy storage devices that can be replenished (e.g., rechargeable batteries). For electrical energy storage devices, in some arrangements, one or more techniques may be implemented for charging and recharging the devices. For example, batteries may be charged through regenerative braking, strategic charging techniques, etc. during appropriate operating periods of the vehicle. In general, while energy is typically lost as heat in conventional braking systems, a regenerative braking system may recover this energy by using an electric generator to assist braking operations. Some systems and techniques may also strategically collect (e.g., leech) energy from the combustion engine during periods of efficient operation (e.g., coasting, traveling, etc.) and later assist the engine during periods of lesser efficiency. For such vehicles, the electric generator can be a device separate from the electric motor, considered as a second operating mode of the electric motor, or implemented through one or more other techniques, individually or in combination. Energy recovered by regenerative braking may be considered insufficient to provide the power needed by the vehicle. To counteract this lack of energy, the electric motor may be engaged during defined periods to assist the combustion engine. One or more control strategies may be used to determine these time periods. Similarly, periods of time may also be determined to engage regenerative braking and strategic charging in order to replenish energy storage. Other operations of the vehicle (e.g., accelerate, decelerate, gear changes, etc.) may also be defined for the control strategies. By developing such strategies to control the assistance provided to combustion engines (during low efficiency periods), energy may be conserved without negatively impacting vehicle performance. In vehicles that use cylinder deactivation for low demand situations, control strategies can be implemented that reduce the number of times that the full number of cylinders are reactivated, allowing the vehicle to drive a greater portion of the time with a reduced number of cylinders and with assistance from the electric motor. In vehicles that use cylinder boosting, control strategies can be implemented that turn on a turbocharger to inject more high-pressure air into the vehicle's cylinders, increasing the power output such that the engine effectively operates as if it had activated more cylinders. This power boosting does not in fact change the number of activated cylinders, but changes performance of the vehicle to replicate the performance of an increased number of activate cylinders.

Some vehicle manufacturers may recommend operations and control strategies for entire classes of vehicles or other types of large vehicle groups (e.g., same model vehicles, same vehicle line, etc.) at particular times (e.g., at the release of the vehicle line). Similarly, the level of assistance provided by an electric motor or other type of alternative fuel system may be a constant. One or more techniques may be implemented to improve recommended operations and control strategies. For example, vehicle performance may be measured to quantify improvements. Fuel efficiency (e.g., miles-per-gallon achieved by the vehicle), fuel consumption (e.g., fuel gallons consumed per hour), and other types of performance measures may be developed and report noticeable to considerable improvement. Once analyzed, the improvements may be incorporated into recommended operations and control strategies. For example, the retrieved data might report that energy provided by the alternative fuel during higher speed operation does not reduce fuel consumption compared to fuel consumption experienced at lower speeds.

Referring to FIG. 1, an example vehicle 100 (e.g., a hybrid automobile) is able to collect and process performance information for fuel economy comparisons. From the collected and analyzed performance information, operations of the vehicle may be adjusted to improve performance (e.g., operations of its alternative fuel system such as an electric motor). To provide this capability, the vehicle includes a performance manager 102 (here embedded in the dashboard of the vehicle 100) that may be implemented in hardware (e.g., a controller 104), software (e.g., executable instructions residing on a computing device contained in the vehicle), a combination of hardware and software, etc. In some arrangements, the performance manager 102 may operate in a generally autonomous manner, however, information from one or more users (e.g., identification of the vehicle operators) may be collected for operations of the performance manager. To collect performance information of the vehicle, data may be collected from one or a variety of inputs. For example, the performance manager 102 may communicate with one or more portions of the vehicle. One or more sensors, components, processing units, etc. of the vehicle may exchange data with the performance manager 102. For example, operational information of the vehicle such as speed, acceleration, etc. may be collected over time (e.g., as the vehicle operates) and provided to the performance manager 102. Other operational information may also be provided from the vehicle; for example, data representing braking, steering, etc. may also be provided to the performance manager 102. Vehicle components that provide information to the performance manager 102 may also include interface modules, circuitry, etc. for controlling the operations of the combustion engine, the electrical motor, etc.

In some situations, data from sources other than the vehicle may also be collected. For example, user input may be provided. In this arrangement, the vehicle 100 includes an electronic display 106 that has been incorporated into its dashboard to present information such as selectable entries regarding different topics (e.g., operator ID, planned vehicle operations, trip destination, etc.). Upon selection, representative information may be gathered and provided to the performance manager 102. To interact with the electronic display 106, a knob 108 illustrates a potential control device; however, one or more other types of devices may be used for user interaction (e.g., a touch screen display, etc.). Similar to using one or more sensors to collect operational data, other types of information may also be gathered; for example, a sensor 110 (here embedded in the dashboard of the vehicle 100) may collect information such as cabin temperature, location of the vehicle (e.g., the sensor being a component of a global positioning system (GPS)) and other types of information. By collecting information such as GPS location, additional information may be provided to the performance manager 102 (e.g., location and destination information) which may be used for quantifying vehicle performance. In some arrangements, information from other vehicles may be used by the performance manager 102. For example, data may be collected from a fleet of vehicles (e.g., similar or dissimilar to the vehicle 100) and used to quantify performance (e.g., based on similarly traveled routes). While one sensor 110 is illustrated in this example, multiple sensors may be located internally or externally to the vehicle for collecting information (e.g., internal or external temperature, etc.). One or more devices present in the vehicle 100 may also be used for information collection; for example, handheld devices (e.g., a smart phone 112, etc.) may collect and provide information (e.g., location information, identify individuals present in the vehicle such as vehicle operators, etc.) for use by the performance manager 102 (e.g., identify driving characteristics of a vehicle operator). Similarly, portions of the vehicle itself (e.g., vehicle components) may collect information for the performance manager 102; for example, one or more of the seats of the vehicle 100 (e.g., driver seat 114) may collect information (e.g., position of the seat to estimate the driver's weight) that is then for being provided to the performance manager 102. Processed data may also be provided; for example, gathered information may be processed by one or more computing devices (e.g., controllers) before being provided to the performance manager 102.

In general, the collected operational information (vehicle speed, acceleration, etc.) can be used for defining vehicle operational situations. For example, the vehicle may operate over ranges of speeds, accelerations, etc., based on the operational environment. For highways, remote rural settings, etc. the vehicle may be driven at relatively high speeds for long periods of time. Alternatively, in a busy urban setting, the vehicle may be operated over a larger range of speeds (e.g., slow speeds due to congested traffic) for relatively short periods of time. Strategies may be developed for controlling the alternative fuel system of a hybrid vehicle (e.g., an electric motor) to assist the combustion engine of the vehicle to improve overall performance.

In some arrangements, along with collecting information at the vehicle, remotely located information sources may be accessed by the vehicle. Similarly, some or all of the functionality of the performance manager 102 may be provided from a remote location. While residing onboard the vehicle 100 in illustrated figure, in some arrangements, the performance manager 102 or a portion of the performance manager may be located and executed at one or more other locations. In such situations, the vehicle 100 may be provided assistance from a remotely located performance manager by using one or more communication techniques and methodologies. For example, one or more wireless communication techniques (e.g., radio frequency, infrared, etc.) may be utilized that call upon one or more protocols and/or standards (e.g., the IEEE 802.11 family of standards such as Wi-Fi, the International Mobile Telecommunications-2000 (IMT-2000) specifications such as 3rd generation mobile telecommunications (3G), 4th generation cellular wireless standards (4G), wireless technology standards for exchanging data over relatively short distances such as Bluetooth, etc.).

Figure 2:
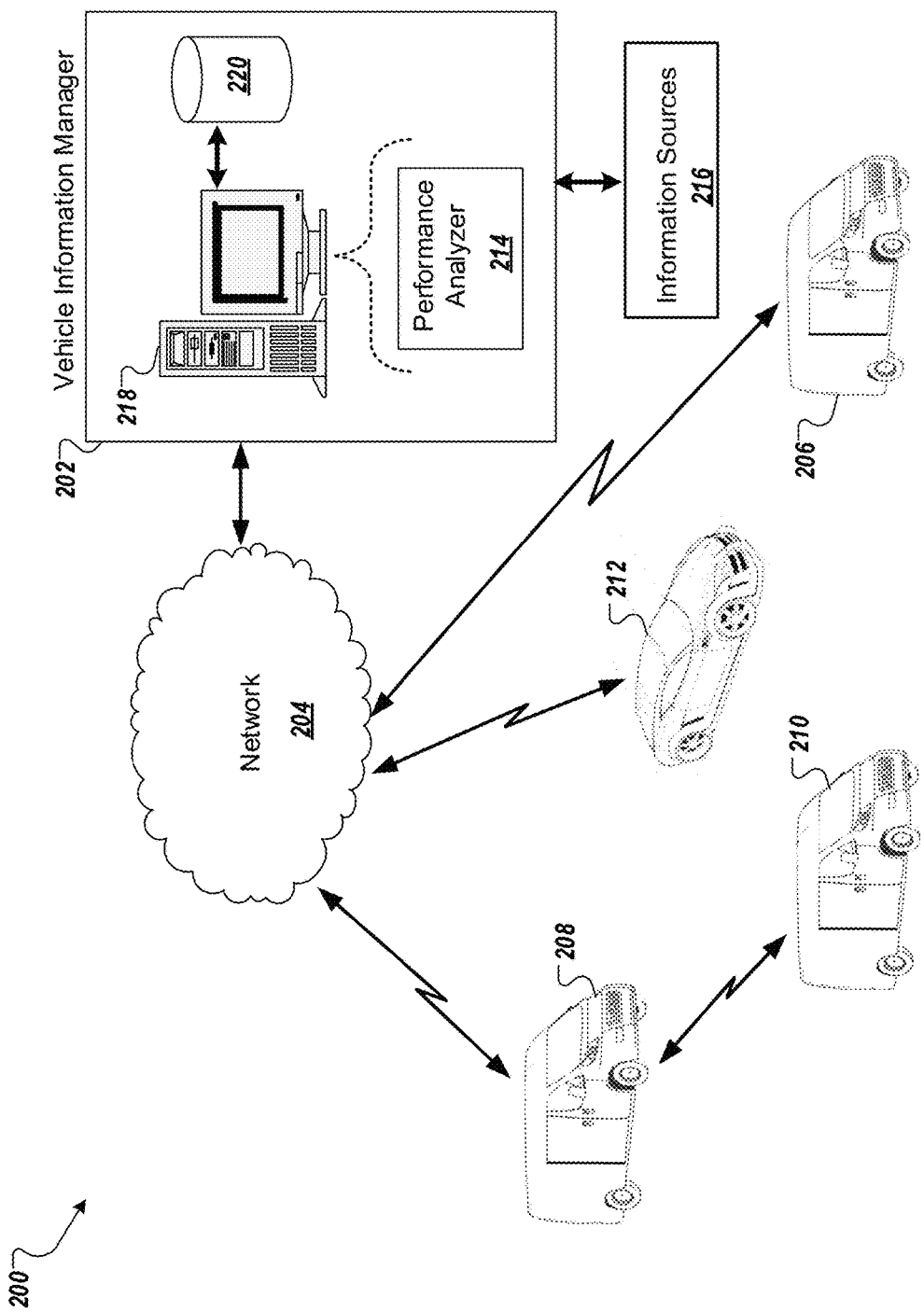
FIG. 2 illustrates a network-based vehicle analyzer for processing data for hybrid electric vehicles.

Referring to FIG. 2, an information exchanging environment 200 is presented that allows information to be provided to a central location for analyzing vehicle performance, such as potential improvements through use of alternative fuel vehicles such as hybrid vehicles. In some arrangements, the information is collected from individual vehicles or other information sources for the performance analysis. One or more techniques and methodologies may be implemented for providing such information to the vehicles. For example, one or more communication techniques and network architectures may be used for exchanging information. In the illustrated example a vehicle information manager 202 communicates through a network 204 (e.g., the Internet, an intranet, a combination of networks, etc.) to exchange information with a collection of vehicles (e.g., a small fleet of supply trucks 206, 208, 210, and an automobile 212). For comparative analysis, one or more of the vehicles may operate with an alternative fuel system (e.g., the supply truck 206 is a hybrid).

In some arrangements, the network architecture 204 may be considered as including one or more of the vehicles. For example, vehicles may include equipment for providing one or more network nodes (e.g., supply truck 208 functions as a node for exchanging information between the supply truck 210 and the network 204). As such, the information exchanging capability may include the vehicles exchanging information with the vehicle information manager 202 and other potential network components (e.g., other vehicles, etc.).

One or more technologies may be used for exchanging information among the vehicle information manager 202, the network 204 (or networks) and the collection of vehicles. For example, wireless technology (capable of two-way communication) may be incorporated into the vehicles for exchanging information with the vehicle information manager 202. Along with providing and collecting information from the vehicles, the vehicle information manger 202 may be capable of processing information (e.g., in concert with a performance analyzer 214 to quantify vehicle performance, compare vehicle performance, etc.) and executing related operations (e.g., store collected and processed information). In some arrangements, the vehicle information manager 202 may operate as a single entity; however, operations may be distributed among various entities to provide the functionality. In some arrangements, some functionality (e.g., operations of the performance analyzer 214) may be considered a service, rather than a product, and may be attained by entering into a relationship with the vehicle information manager 202 (e.g., purchase a subscription, enter into a contractual agreement, etc.). As such, the vehicle information manager 202 may be considered as being implemented as a cloud computing architecture in which its functionality is perceived by users (e.g., vehicle operators, business operators, vehicle designers and manufacturers, etc.) as a service rather than a product. For such arrangements, users may be provided information (e.g., vehicle performance, comparative performances, control strategies, etc.) from one or more shared resources (e.g., hardware, software, etc.) used by the vehicle information manager 202. For service compensation, one or more techniques may be utilized; for example, subscription plans for various time periods may be implemented (e.g., a time period for measuring the performance of a current fleet of vehicles along with candidate hybrid vehicles to demonstrate potential performance gains).

Similar to an onboard assistance manager (e.g., the performance manager 102 of FIG. 1), an off-vehicle performance analyzer (e.g., the performance analyzer 214) may use information from a vehicle (e.g., collected performance data, distributions of data, etc.) to determine one or more performance metrics of the vehicle, comparison metrics, etc.

Along with information being provided by one or more vehicles (e.g., received onboard, received through the network 204, etc.), the vehicle information manager 202 may utilize data from other sources for performance analysis, etc. For example, information sources 216 external to the vehicle information manager 202 may provide vehicle related information (e.g., manufacturer recommendations for performance, vehicle load conditions, etc.), environmental information (e.g., current road conditions where the vehicle is operating, traffic conditions, topographical information, weather conditions and forecasts, etc.). In some arrangements, the information sources 216 may be in direct communication with the vehicle information manager 202; however, other communication techniques may also be implemented (e.g., information from the information sources 216 may be provided through one or more networks such as network 204).

In the illustrated example, to provide such functionality, the vehicle information manager 202 includes a server 218 that is capable of being provided information by the network 204 and the information sources 216. Additionally, the server 218 is illustrated as being in direct communication with a storage device 220 that is located at the vehicle information manager 202 (however, remotely located storage may be accessed by the server 218). In this example the functionality of the performance analyzer 214 is located off-board a vehicle while the functionality of the performance manager 102 (shown in FIG. 1) is located on-board the vehicle. In some examples, some functionality of the performance analyzer 214 and the performance manager 102 may be executed at other locations, distributed across multiple locations, etc. In one arrangement, a portion of the functionality of the performance analyzer 214 may be executed on-board a vehicle or a portion of the performance manager 102 may executed at the vehicle information manager 202. Information provided by one or more of the sources (e.g., the vehicles, information sources 216, etc.), performance metrics and comparisons may be developed by the performance analyzer 214. For example, one or more metrics may be determined that provides a measure of fuel economy of each vehicle, metrics that represent comparison between vehicles (e.g., fuel saving of a hybrid vehicle compared to a combustion engine vehicle). Along with determining such metrics and comparisons, functionality of the performance analyzer 214 may appropriately manage collected data, distributions, determined performance and comparison metrics, etc. for delivery (e.g., to service subscribers, entities, vehicles, etc.). For example, one or more database systems, data management architectures and communication schemes may be utilized by the performance analyzer 214 for information distribution. In some arrangements, such distribution functionality may be provided partially or fully by the performance analyzer 214 or external to the performance analyzer 214. In some arrangements this distributed functionality may be provided by other portions of the vehicle information manager 202 or provided by another entity separate from the information manager for distributing metrics and/or other types of performance and/or comparison based information. Further, while a single server (e.g., server 218) is implemented in this arrangement to provide the functionality for the vehicle information manager 202, additional servers or other types of computing devices may be used to provide the functionality. For example, operations of the performance analyzer 214 may be distributed among multiple computing devices in one or more locations.

Upon one or more metrics (e.g., performance, comparison, etc.) being produced, one or more operations may be executed to provide appropriate information, for example, to one or more entities, vehicles, etc. By employing one or more data transition techniques information may be delivered through the network 204 along with other types of communication systems. In some arrangements one or more trigger events may initiate the information being sent. For example, upon one or more messages, signals, etc. being received at the vehicle information manager 202 (e.g., a request for particular performance information is received), data representing the requested performance information may be provided.

Figure 3:
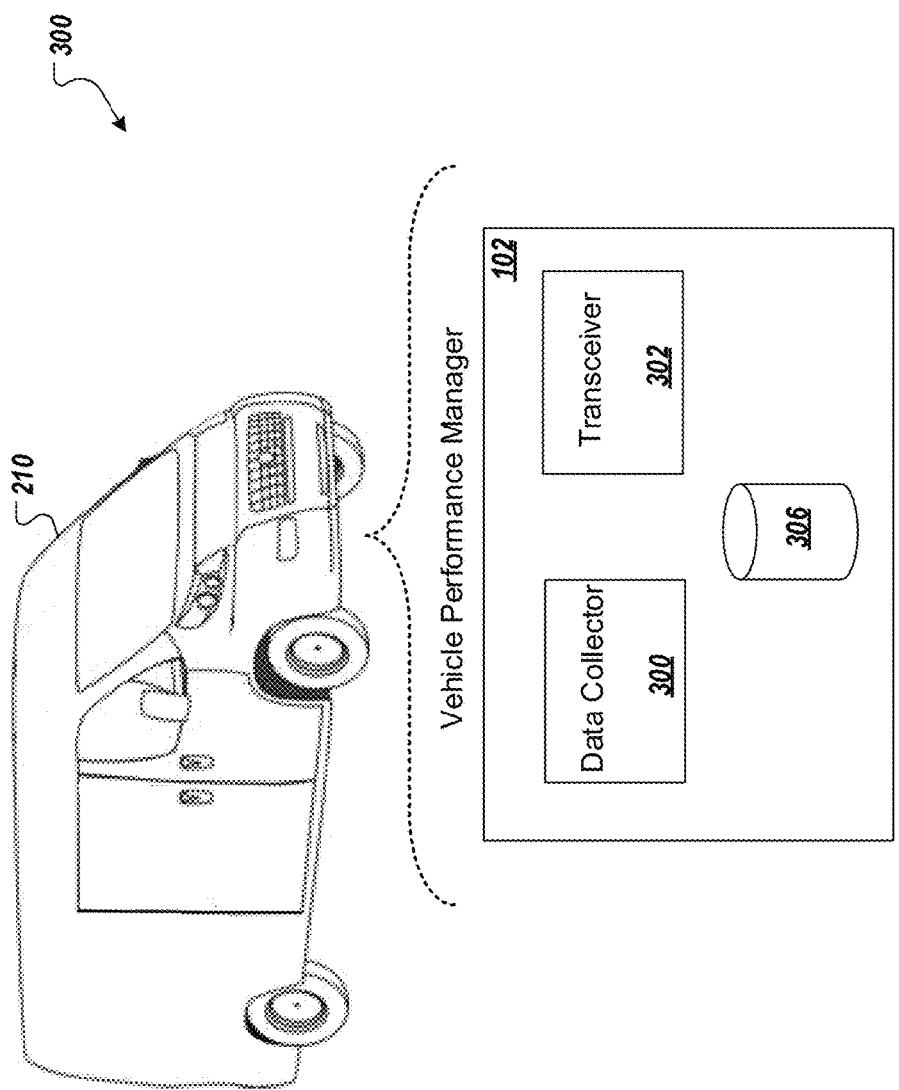
FIG. 3 illustrates the input and output data flow of a vehicle information manager.

Referring to FIG. 3, one of the vehicles presented in FIG. 2 (i.e., vehicle 210) illustrates potential components included in the vehicle performance manager 102, which may be implemented in hardware, software, a combination of hardware and software, etc. One included component for this arrangement is a data collector 300 that is capable of interfacing with various components of the vehicle to collect vehicle-related information such as operational parameters. Additionally, the vehicle data collector 300 may be capable of collecting information from other sources external to the vehicle. Also included is a transceiver 302 that is capable of transmitting information from the vehicle to one or more locations (e.g., the vehicle information manager 202). While the transceiver 302 is also capable of receiving information (e.g., from the vehicle information manager 202), in some arrangements such a capability may be absent (thereby only allowing for transmission of information).

The vehicle performance manager 102 may implement one or more techniques to improve the efficiency of fuel consumption of the vehicle 210 for example, monitoring speed, acceleration, deceleration, etc. This monitoring can be done by sensors 110 which interface with data collector 300 and, for example, detect displacement of the vehicle's accelerator pedal, brake pedal, etc. (due to the driver). To assist the operations of the vehicle performance manager, the transceiver 302 and the data collector 300, one or more data storage techniques may be employed. As illustrated, one or more storage devices (e.g., memory components, hard drives, etc.) such as storage device 306 may be included in the performance manager 102. In addition to assisting with the operations of the information manager components, the storage device 306 may also provide a data store for information such as operational parameters (collected during the operation of the vehicle) that can be later accessed. For example, after traveling its route, collected data may retrieved from the storage device 306 (e.g., by the vehicle owner, the vehicle information manager 202, etc.) for analysis to quantify performance, to compare performance with other vehicles, etc.

The vehicle performance manager 102 can implement cylinder deactivation in vehicle 210. Cylinder deactivation is used to reduce the fuel consumption and emissions of the internal combustion engine during operation with light loads on the engine. In typical driving with light loads the driver uses only a fraction of an engine's maximum power, causing inefficiency. To improve efficiency, cylinder deactivation at light load is employed, meaning that there are fewer cylinders drawing air from the intake manifold. This form of variable displacement occurs by changing, for example, a V6 or V8 engine into an effective smaller engine by "turning off" half of the cylinders under light-load conditions. Operation without variable displacement in the form of cylinder deactivation is wasteful because fuel is continuously pumped into each cylinder and combusted even though maximum performance is not required. By shutting down half of an engine's cylinders, the amount of fuel being consumed is reduced. Cylinder deactivation can be achieved by keeping the intake and exhaust valves closed for a particular cylinder and possibly also cutting fuel delivery to the disabled cylinders. As a driver maneuvers a vehicle under changing conditions the vehicle transitions between normal engine operation and cylinder deactivation as the load is increased or decreased due to driving conditions.

The vehicle performance manager 102 can implement engine boosting in vehicle 210. Engine boosting is used to provide high torque from the internal combustion engine during operation with high loads on the engine while reducing the fuel consumption and emissions during low and moderate loads. In many driving situations, the light loads that are typically applied to the car are sometimes increased (e.g., hills). To improve performance and efficiency, engine boosting at high load is employed, meaning that air drawn by the cylinders from the intake manifold is supplemented with additional air. This form of variable displacement changes, for example, a V6 engine into an effective larger V8 engine. Operation without variable displacement in the form of engine boosting allows a smaller-sized engine to operate at efficient levels for light loads, and additional combustion occurs only when maximum performance is required. As a driver maneuvers a vehicle under changing conditions the vehicle transitions between normal engine operation and boosted performance as the load is increased or decreased due to driving conditions.

Figure 4:
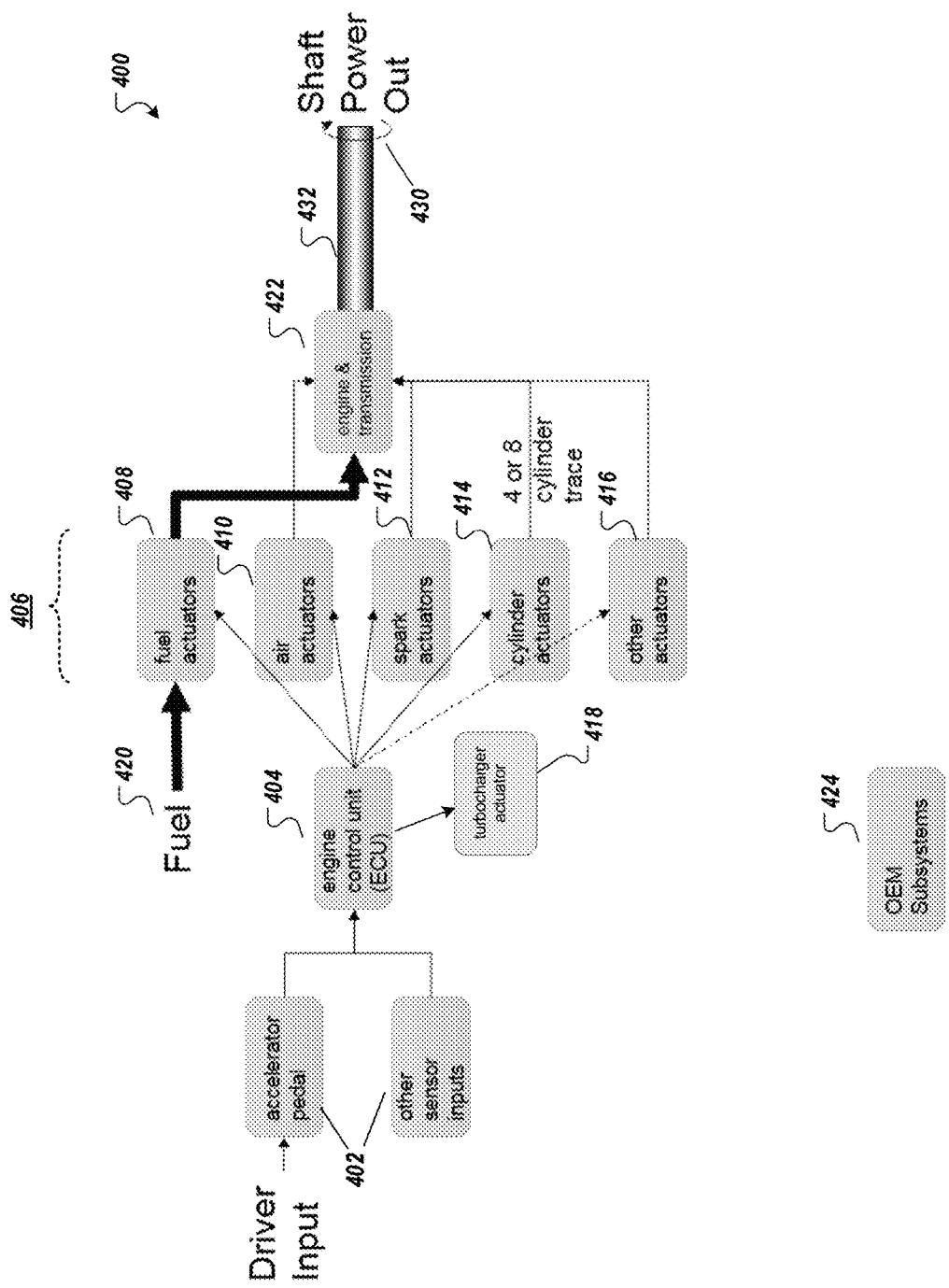
FIG. 4 illustrates a schematic of engine control for cylinder deactivation for a combustion engine vehicle.

Referring to FIG. 4, an original equipment manufacturer (OEM) system 400 that uses cylinder deactivation or engine boosting is illustrated. The driver inputs commands to the vehicle and those inputs are detected by sensors 402 that are part of data collector 300, (e.g., sensors 110). These sensors can be, for example, on the accelerator pedal, or be other sensors elsewhere in the vehicle. These sensors 402 also include the fuel rate. The inputs are delivered to an engine control unit (ECU) 404 that interprets the inputs and in turn sends signals to various actuatable components of the vehicle 406. These portions include fuel actuators 408 (that receive fuel from a fuel source 420, e.g., the gas tank), air actuators 410, spark actuators 412, cylinder actuators 414, and other actuators 416. The air actuators 410 may include the ability to boost the airflow, or turbocharge the airflow.

Either all or a subset of the cylinder actuators will be activated (e.g., either 4 or 8 cylinders), and the coordinated inputs of these various actuatable components 406 operate the internal combustion engine 422 and transmit torque (represented by arrow 430) along the driveshaft 432 to drive the vehicle as input by the driver (along with any other OEM subsystems 424). Alternatively, the turbocharger function of the air actuators 410 may or may not be activated, and the coordinated inputs of the various actuatable components 406 operate the internal combustion engine 422 and transmit torque (represented by arrow 430) along the driveshaft 432 to drive the vehicle as input by the driver (along with any other OEM subsystems 424).

Figure 5A:
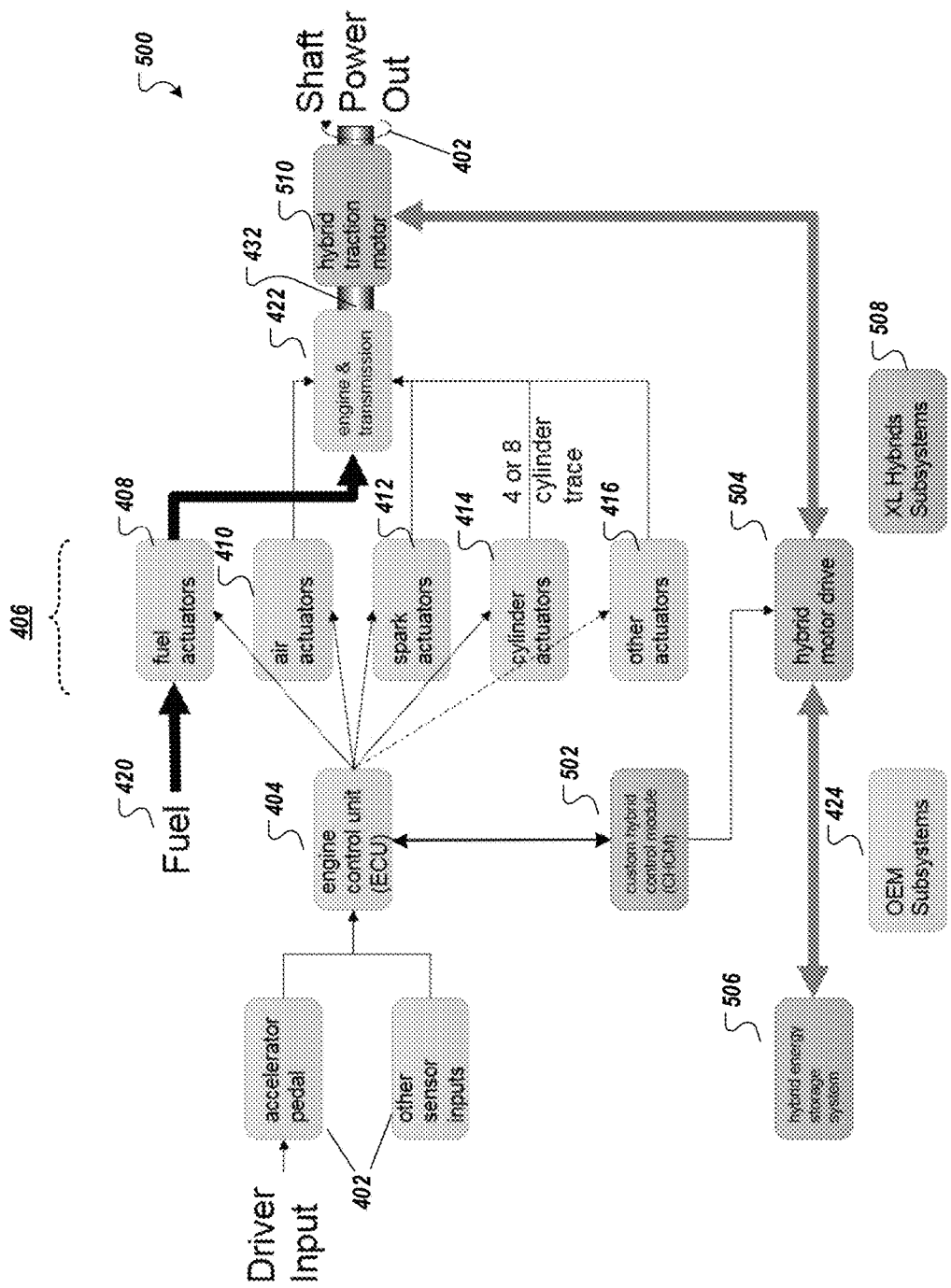
FIG. 5A illustrates a schematic of engine control for cylinder deactivation for a hybrid electric vehicle using the vehicle information manager.

Referring to FIG. 5A, the OEM system 450 is modified into an improved system 500 that uses a custom hybrid control module (CHCM) 502 incorporated into the performance manager 102 to improve cylinder deactivation control. As for the OEM system 450, the driver inputs commands to the vehicle and those inputs are detected by sensors 402 whose signals are delivered to an engine control unit (ECU) 404 that interprets the inputs and in turn sends signals to various actuatable components of the vehicle 406. These actuatable components 406 include fuel actuators 408 (that receive fuel from gas tank 420), air actuators 410, spark actuators 412, cylinder actuators 414, and other actuators 416 if included by the OEM 450 in the vehicle design. The ECU 404 additionally communicates with the custom hybrid control module 502.

Signals from the ECU 404 are delivered to the custom hybrid control module 502 which provides commands to the hybrid motor drive 504 that is incorporated in the vehicle as part of the hybrid electric system 500. A solely internal combustion engine vehicle can be converted into a hybrid electric vehicle by integrating the original software and power train with an after-market conversion such as systems available from XL Hybrids (Brighton, Mass.). The system 500 is calibrated to vehicle model and in some instances uses automatic machine learning to improve the control of the system over time. The hybrid motor drive 504 can either output to or receive energy from a hybrid energy storage system 506, and along with other hybrid conversion subsystems 508 communicates with a hybrid traction motor 510. The hybrid traction motor 510 works in tandem with the internal combustion engine 422 to modify the torque delivered to the driveshaft 432 and cause the vehicle to execute the commands input by the user.

With the custom hybrid control module 502 implemented, both the fuel rate delivered from the fuel source 420 and command for conversion between 4 or 8 cylinders carried out by the cylinder actuators 414 are inputs to the internal combustion engine 422 that is driven by the OEM ECU 404 commands which is in turn driven by the driver's foot command on the accelerator pedal 402. The custom hybrid control module 502 determines the threshold load on the engine 422 at which activation/deactivation occurs. The custom hybrid control module 502 will calculate if a load greater than the threshold is required by the drivetrain of the vehicle and will apply the appropriate electric propulsion assistance via the hybrid traction motor 510 to keep the load on engine 422 below that threshold and with cylinders deactivated.

In the absence of a hybrid system (e.g., the system in FIG. 4), if the driver pushes the pedal slightly, to get the desired acceleration and speed from the vehicle the ECU 404 responds by determining the fuel rate, air rate, spark rate, and in the case of a V8 engine with the cylinder deactivation feature the ECU 404 also determines whether to activate 4 of the 8 cylinders via cylinder actuators 414 because the demand is low. If the vehicle is moving too slowly for the driver, then the driver pushes harder on the pedal 402 and the ECU 404 increases the fuel rate, air rate, spark rate, and decides when to activate all 8 cylinders.

Figure 5B:
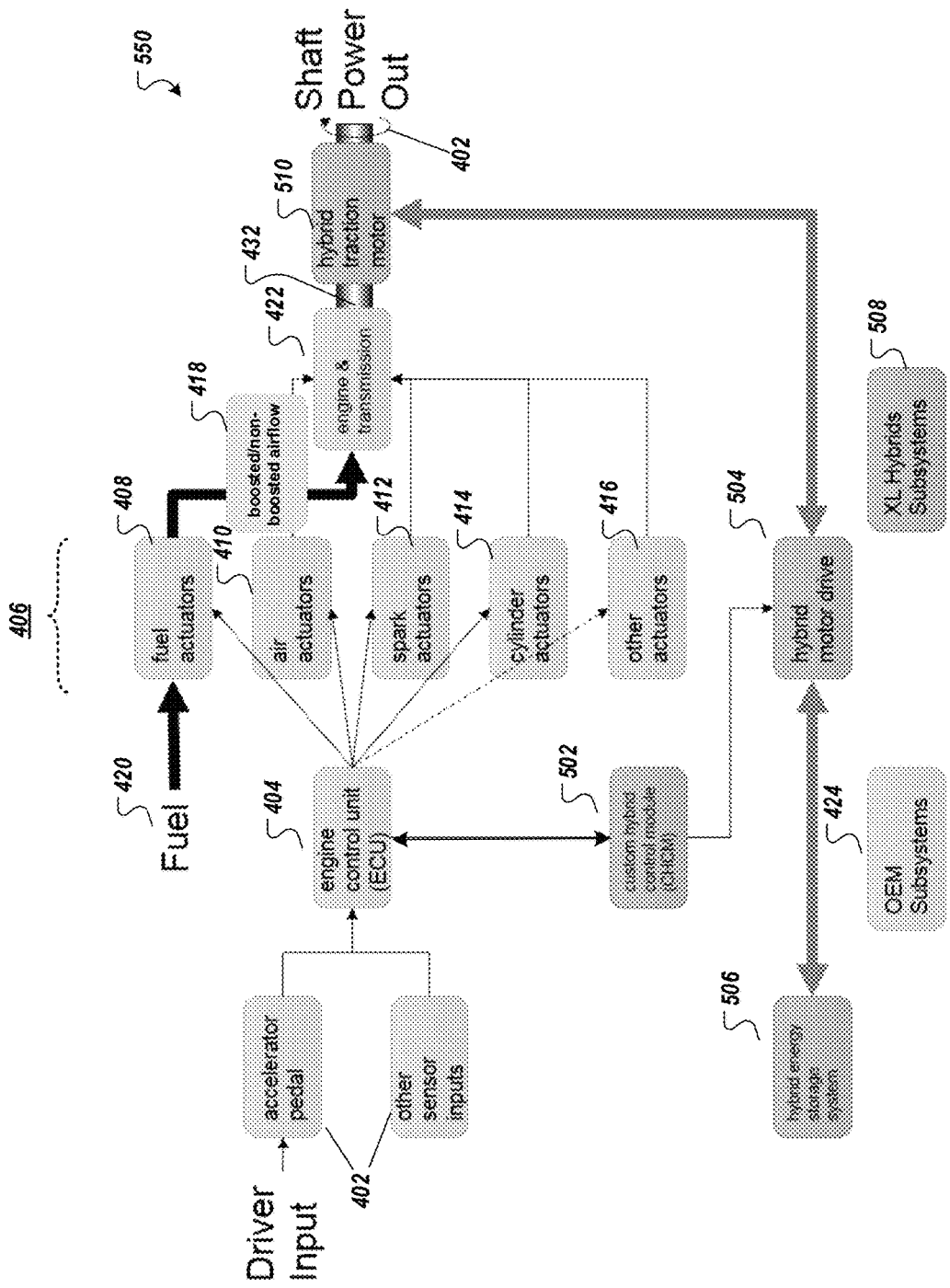
FIG. 5B illustrates a schematic of engine control for engine boosting for a hybrid electric vehicle using the vehicle information manager.

Referring to FIG. 5B, the OEM system 450 is modified into an improved system 550 that uses a custom hybrid control module (CHCM) 502 incorporated into the performance manager 102 to improve cylinder deactivation control (similar parts as for system 500 of FIG. 5A are indicated by the same reference numbers). As for the OEM system 450, the driver inputs commands to the vehicle and those inputs are detected by sensors 402 whose signals are delivered to an engine control unit (ECU) 404 that interprets the inputs and in turn sends signals to various actuatable components of the vehicle 406. These actuatable components 406 include fuel actuators 408 (that receive fuel from gas tank 420), air actuators 410, spark actuators 412, cylinder actuators 414, other actuators 416 if included by the OEM 450 in the vehicle design, and turbocharger actuator 516. The ECU 404 additionally communicates with the custom hybrid control module 502. The air actuators can include a turbocharge function 418 that creates boosted airflow, which increases the internal combustion engine's power output by engaging an air turbine forcing extra air into the combustion chamber.

Signals from the ECU 404 are delivered to the custom hybrid control module 502 which provides commands to the hybrid motor drive 504 that is incorporated in the vehicle as part of the hybrid electric system 550. A solely internal combustion engine vehicle can be converted into a hybrid electric vehicle by integrating the original software and power train with an after-market conversion such as systems available from XL Hybrids (Brighton, Mass.). The system 550 is calibrated to vehicle model and in some instances uses automatic machine learning to improve the control of the system over time. The hybrid motor drive 504 can either output to or receive energy from a hybrid energy storage system 506, and along with other hybrid conversion subsystems 508 communicates with a hybrid traction motor 510. The hybrid traction motor 510 works in tandem with the internal combustion engine 422 to modify the torque delivered to the driveshaft 432 and cause the vehicle to execute the commands input by the user.

With the custom hybrid control module 502 implemented, both the fuel rate delivered from the fuel source 420 and command for activation of the turbocharge function of the air actuator 410 is are inputs to the internal combustion engine 422 that is driven by the OEM ECU 404 commands which is in turn driven by the driver's foot command on the accelerator pedal 402. The custom hybrid control module 502 determines the threshold load on the engine 422 at which activation/deactivation occurs. The custom hybrid control module 502 will calculate if a load greater than the threshold is required by the drivetrain of the vehicle and will apply the appropriate electric propulsion assistance via the hybrid traction motor 510 to keep the load on engine 422 below that threshold and with cylinders deactivated.

When the hybrid system is present, as in FIG. 5B, if the driver pushes the pedal 402 to accelerate the vehicle, the ECU 404 then determines whether or not to stay in the 4 cylinder mode. The custom hybrid control module 502 monitors the ECU signals to make sure the hybrid system provides enough assist to keep the load on the engine 422 below the point where the ECU 404 would decide to activate all 8 cylinders. The hybrid motor drive 504 will provide additional power to the hybrid traction motor 510, allowing the increased load to be met while 4 of the 8 cylinder actuators 414 keep the cylinders deactivated since the load on the engine 422 is kept below a determined threshold. Demands due to increased loads such as those that occur when passing or going up a hill during highway driving are met by assistance from the hybrid traction motor 510 and the custom hybrid control module 502 ensures that the additional four cylinder actuators 414 remain deactivated.

In a turbocharger system (e.g. FIG. 4), if the driver pushes the pedal slightly, to get the desired acceleration and speed from the vehicle the ECU 404 responds by determining the fuel rate, air rate, spark rate, and also determines whether to boost one or more of cylinders via turbocharge actuation to boosted from non-boosted air flow of the air actuators 410. This boost will not take place when the demand is low. If the vehicle is moving too slowly for the driver, then the driver pushes harder on the pedal 402 and the ECU 404 increases the fuel rate, air rate, spark rate, and decides when to activate the turbochargers. When the hybrid system is present, as in FIG. 5B, if the driver pushes the pedal 402 to accelerate the vehicle, the ECU 404 then determines whether or not to stay in the non-boosted mode. The custom hybrid control module 502 monitors the ECU signals to make sure the hybrid system provides enough assist to keep the load on the engine 422 below the point where the ECU 404 would decide to boost the engine. The hybrid motor drive 504 will provide additional power to the hybrid traction motor 510, allowing the increased load to be met while the engine is kept in the non-boosted state since the load on the engine 422 is kept below a determined threshold. Demands due to increased loads such as those that occur when passing or going up a hill during highway driving are met by assistance from the hybrid traction motor 510 and the custom hybrid control module 502 ensures that the additional four cylinder actuators 414 remain deactivated.

Figure 6A:
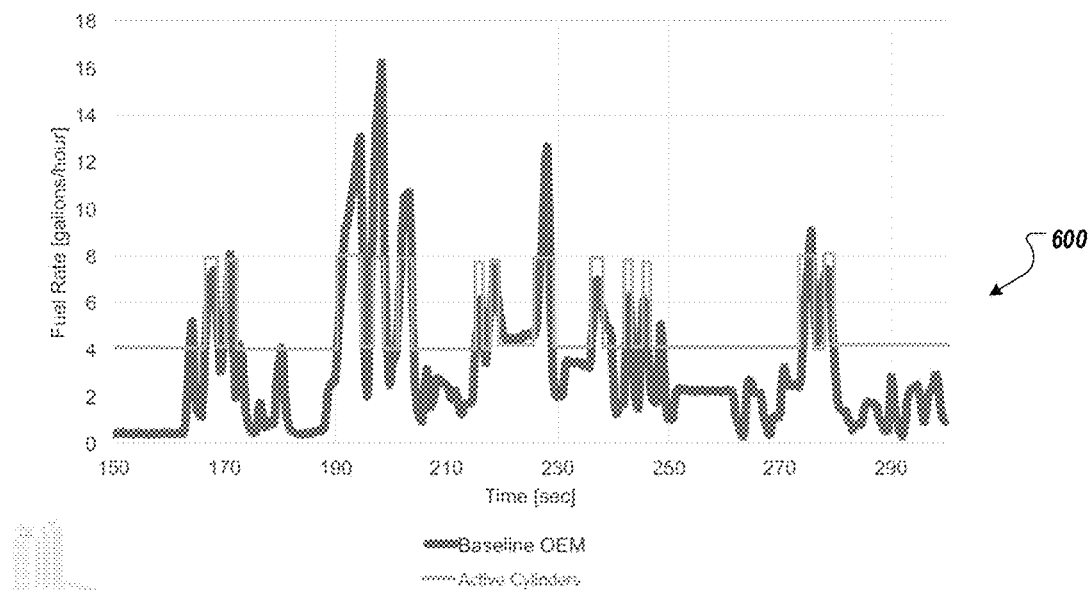
FIG. 6A is a graph of fuel consumption over a drive cycle for an internal combustion vehicle with traditional cylinder deactivation.

Referring to FIG. 6A, a graph 600 shows exemplary drive cycle or driving cycle data for an internal combustion vehicle with traditional cylinder deactivation. A drive cycle is a fixed schedule of vehicle operation which allows for emissions or other tests to be conducted under controlled and reproducible conditions. Drive cycles are usually shown in terms of vehicle speed and gear selection as a function of time, and here is presented as fuel rate as a function of time. A skilled driver follows the drive cycle either in a lab setting or on the road and sensors are provided to ensure that the driven cycle is within allowed tolerances to the defined cycle.

Figure 6B:
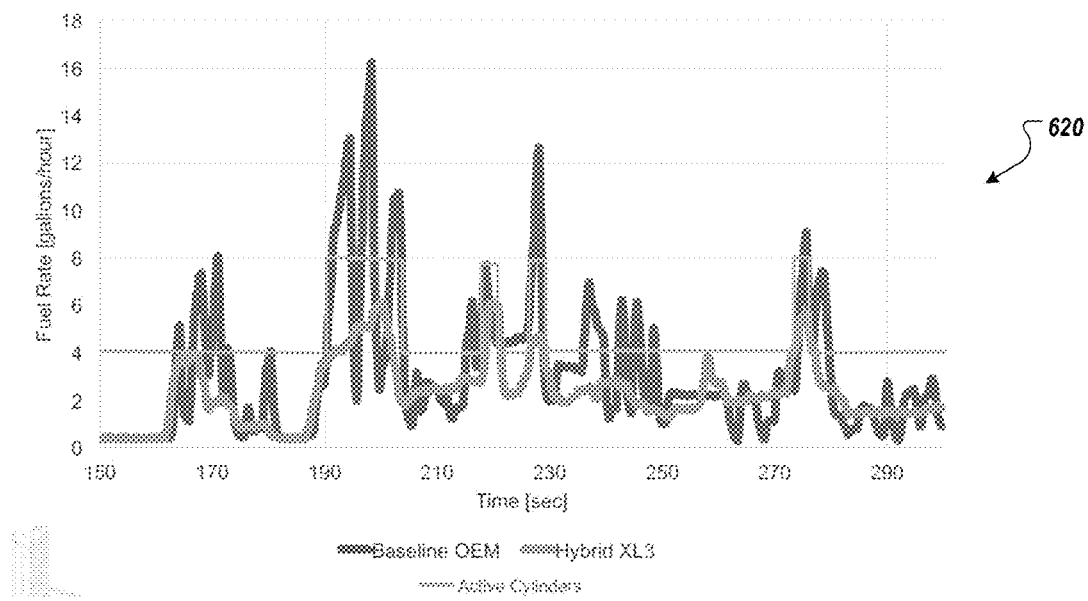
FIG. 6B is a graph of fuel consumption over a drive cycle for a hybrid vehicle implementing the system for cylinder deactivation described herein.

Referring to FIGS. 6A and 6B, the fuel consumption during a city drive cycle is greatly reduced when using the custom hybrid control module 502. FIG. 6A shows an OEM system with baseline (e.g., unmodified) fuel consumption and the fuel deactivation schedule that toggles between 4 and 8 cylinders. In this exemplary OEM system, the fuel rate of threshold is approximately 6 gallons/hr., causing activation or deactivation of cylinder occurs each time that the threshold is crossed both when increasing and decreasing fuel rate. By contrast, FIG. 6B shows a graph 620 of an exemplary drive cycle for a hybrid electric vehicle with system 500 that includes the custom hybrid control module 502. Here, deactivation/reactivation between 4 and 8 cylinders occurs at approximately 8 gallons/hr. The number of switches is thereby greatly reduced, resulting in greatly lowered fuel consumption. Demands due to somewhat increased loads in highway and in city driving are met by assistance from the hybrid traction motor 510 and the custom hybrid control module 502 keeps the additional four cylinder actuators 414 deactivated a greater portion of the time. The number of cylinder activation/deactivations can be reduced, by e.g., 50%, or 75%. The amount of time in which cylinders are not deactivated can be reduced, by e.g., 50% or 75%. The threshold at which the system 500 allows cylinders to be activated can be increased or reduced from that shown in FIG. 6B. This increased threshold can be chosen so that all cylinders are activated only under extreme conditions, e.g., towing of very heavy loads or very high acceleration.

The system 500, 550 can include control logic for hysteresis of the load to prevent cycling back and forth activating and deactivating cylinders when limits of the hybrid traction motor 510 are reached. An engine displaying identical upwards and downwards numbers in monitored signals (e.g., fuel rate compared to load) is likely not sending a real signal, but would nevertheless trigger a change in the state of the engine (e.g., an unneeded change in the state of the engine). To prevent this unnecessary cycling, the control logic requires the signals being monitored to have a predetermined amount of hysteresis before reactivating or deactivating cylinders (or the turbocharger).

Figure 7:
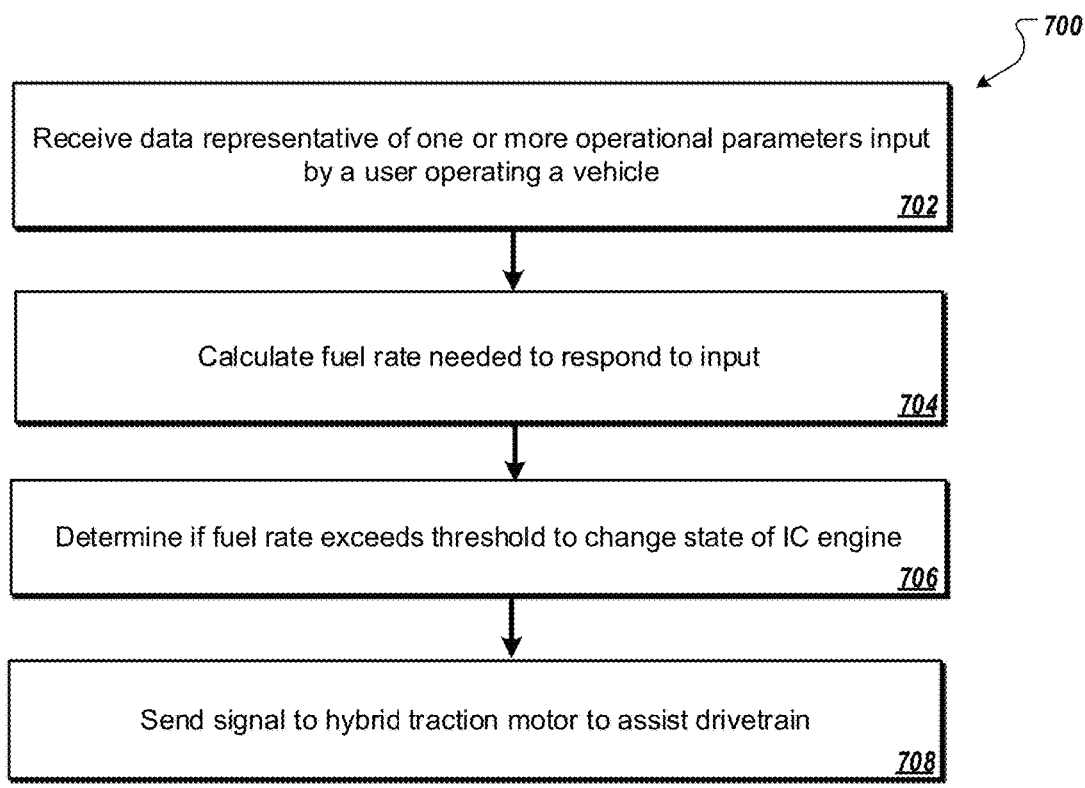
FIG. 7 is a flow chart of representative operations for cylinder deactivation.

In the example shown in FIGS. 5A and 7, fuel rate is the factor determining the threshold load on the engine 422. However, other parameters can determine the threshold load, alone or in combination with fuel rate. The threshold load chosen by custom hybrid control module 502 can be a fixed fuel rate value, or can be a combination of several conditions and sensor inputs to the OEM ECU 404.

Referring to FIG. 7, a method 700 for deactivation of cylinders is shown. The driver gives input via e.g., the accelerator at step 702, and the system 500, 550 calculates the fuel rate needed to respond to the input, step 704. The system 500, 550 determines if the fuel rate exceeds threshold to activate hybrid assist, step 706. The assist can be to activate deactivated cylinders to meet the engine load required by the fuel rate or to activate the turbocharger to meet the engine load required by the fuel rate, and sends a signal to assist the vehicle's drivetrain, step 708. This assistance is hybrid assistance and keep the cylinders or turbocharger deactivated.

Although deactivation from an 8-cylinder to a 4-cylinder engine has been described, other configurations are possible. For example, 2 cylinders out of 6 can be deactivated, or 2 cylinders out of 8 can be deactivated.

In some embodiments the custom hybrid control module 502 can include a machine learning component. In some embodiments the control of the vehicle by custom hybrid control module 502 can change over time due to updates received at the transceiver 302. These updates can include information received from other vehicles such as vehicles 208, etc. shown in FIG. 2.

Figure 8:
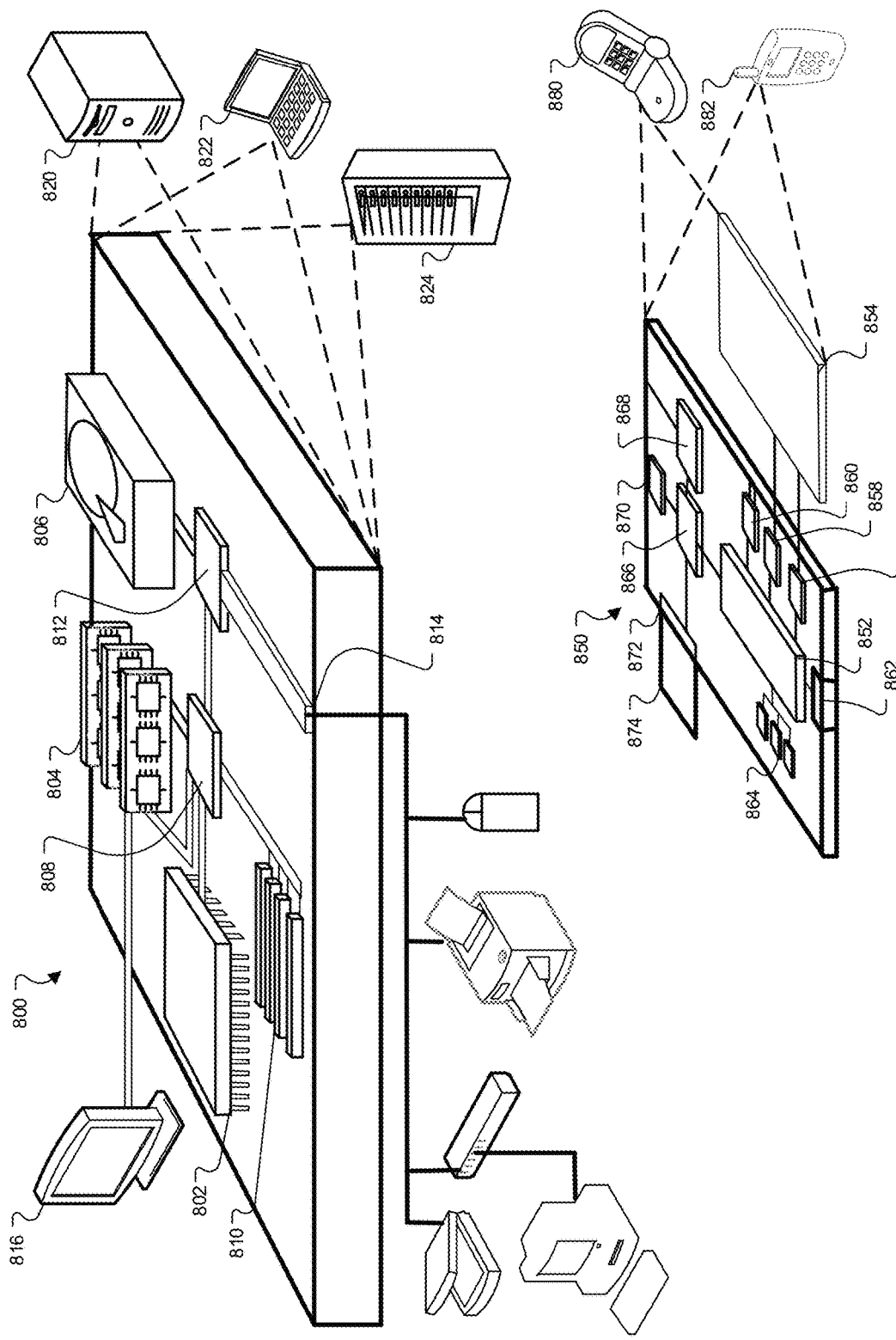
FIG. 8 illustrates an example of a computing device and a mobile computing device that can be used to implement the techniques described here.

FIG. 8 shows an example of example computer device 800 and example mobile computer device 850, which can be used to implement the techniques described herein. For example, a portion or all of the operations of an assistance manager (e.g., the performance manger 102 shown in FIG. 1, the assistance manager 214 shown in FIG. 2, etc.) may be executed by the computer device 800 and/or the mobile computer device 850. Computing device 800 is intended to represent various forms of digital computers, including, e.g., laptops, desktops, workstations, personal digital assistants, servers, blade servers, mainframes, and other appropriate computers. Computing device 850 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 800 includes processor 802, memory 804, storage device 806, high-speed interface 808 connecting to memory 804 and high-speed expansion ports 810, and low speed interface 812 connecting to low speed bus 814 and storage device 806. Each of components 802, 804, 806, 808, 810, and 812, are interconnected using various busses, and can be mounted on a common motherboard or in other manners as appropriate. Processor 802 can process instructions for execution within computing device 800, including instructions stored in memory 804 or on storage device 806 to display graphical data for a GUI on an external input/output device, including, e.g., display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

Memory 804 stores data within computing device 800. In one implementation, memory 804 is a volatile memory unit or units. In another implementation, memory 804 is a non-volatile memory unit or units. Memory 804 also can be another form of computer-readable medium, including, e.g., a magnetic or optical disk.

Storage device 806 is capable of providing mass storage for computing device 800. In one implementation, storage device 806 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 804, storage device 806, memory on processor 802, and the like.

High-speed controller 808 manages bandwidth-intensive operations for computing device 800, while low speed controller 812 manages lower bandwidth-intensive operations. Such allocation of functions is an example only. In one implementation, high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 800 can be implemented in a number of different forms, as shown in the figure. For example, it can be implemented as standard server 820, or multiple times in a group of such servers. It also can be implemented as part of rack server system 824. In addition or as an alternative, it can be implemented in a personal computer including, e.g., laptop computer 822. In some examples, components from computing device 800 can be combined with other components in a mobile device (not shown), including, e.g., device 850. Each of such devices can contain one or more of computing device 800, 850, and an entire system can be made up of multiple computing devices 800, 850 communicating with each other.

Computing device 850 includes processor 852, memory 864, an input/output device including, e.g., display 854, communication interface 866, and transceiver 868, among other components. Device 850 also can be provided with a storage device, including, e.g., a microdrive or other device, to provide additional storage. Each of components 850, 852, 864, 854, 866, and 868, are interconnected using various buses, and several of the components can be mounted on a common motherboard or in other manners as appropriate.

Processor 852 can execute instructions within computing device 850, including instructions stored in memory 864. The processor can be implemented as a chipset of chips that include separate and multiple analog and digital processors. The processor can provide, for example, for coordination of the other components of device 850, including, e.g., control of user interfaces, applications run by device 850, and wireless communication by device 850.

Processor 852 can communicate with a user through control interface 858 and display interface 856 coupled to display 854. Display 854 can be, for example, a TFT LCD (Thin-Film-Transistor Liquid Crystal Display) or an OLED (Organic Light Emitting Diode) display, or other appropriate display technology. Display interface 856 can comprise appropriate circuitry for driving display 854 to present graphical and other data to a user. Control interface 858 can receive commands from a user and convert them for submission to processor 852. In addition, external interface 862 can communicate with processor 842, so as to enable near area communication of device 850 with other devices. External interface 862 can provide, for example, for wired communication in some implementations, or for wireless communication in other implementations, and multiple interfaces also can be used.

Memory 864 stores data within computing device 850. Memory 864 can be implemented as one or more of a computer-readable medium or media, a volatile memory unit or units, or a non-volatile memory unit or units. Expansion memory 874 also can be provided and connected to device 850 through expansion interface 872, which can include, for example, a SIMM (Single In Line Memory Module) card interface. Such expansion memory 874 can provide extra storage space for device 850, or also can store applications or other data for device 850. Specifically, expansion memory 874 can include instructions to carry out or supplement the processes described above, and can include secure data also. Thus, for example, expansion memory 874 can be provided as a security module for device 850, and can be programmed with instructions that permit secure use of device 850. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 864, expansion memory 874, and/or memory on processor 852, which can be received, for example, over transceiver 868 or external interface 862.

Device 850 can communicate wirelessly through communication interface 866, which can include digital signal processing circuitry where necessary. Communication interface 866 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, including, e.g., using a Bluetooth®, Wi-Fi, or other such transceiver (not shown). In addition, GPS (Global Positioning System) receiver module 870 can provide additional navigation- and location-related wireless data to device 850, which can be used as appropriate by applications running on device 850.

Device 850 also can communicate audibly using audio codec 860, which can receive spoken data from a user and convert it to usable digital data. Audio codec 860 can likewise generate audible sound for a user, including, e.g., through a speaker, e.g., in a handset of device 850. Such sound can include sound from voice telephone calls, can include recorded sound (e.g., voice messages, music files, and the like) and also can include sound generated by applications operating on device 850.

Computing device 850 can be implemented in a number of different forms, as shown in the figure. For example, it can be implemented as cellular telephone 880. It also can be implemented as part of smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
   receiving data representative of one or more operational parameters for a vehicle;
   calculating a fuel rate required for an internal combustion engine of the vehicle to respond to the one or more operational parameters;
   determining if the required fuel rate exceeds a threshold which would cause a state change in performance of the internal combustion engine;
   if the required fuel rate exceeds the threshold, calculating an amount of assistance required for an electric hybrid traction motor to provide to a drivetrain of the vehicle to implement the received one or more operational parameters of the vehicle; and
   providing the amount of assistance to the drivetrain of the vehicle, thereby preventing the state change in the performance of the internal combustion engine, wherein the state change is activation of a subset of cylinders present in the internal combustion engine which are in a deactivated state.

2. The computing device-implemented method of claim 1, wherein at least one of the one or more operational parameters represents a speed of the vehicle.

3. The computing device-implemented method of claim 1, wherein at least one of the one or more operational parameters represents an acceleration of the vehicle.

4. The computing device-implemented method of claim 1, wherein the data is received from one or more sensors located in the vehicle.

5. The computing device-implemented method of claim 1, wherein the electric hybrid traction motor converts electrical power to mechanical power.

6. A system comprising:
   a computing device comprising:
      a memory configured to store instructions; and
      a processor to execute the instructions to perform operations comprising:
         receiving data representative of one or more operational parameters for a vehicle;
         calculating a fuel rate required for an internal combustion engine of the vehicle to respond to the one or more operational parameters;
         determining if the required fuel rate exceeds a threshold which would cause a state change in performance of the internal combustion engine;
         if the required fuel rate exceeds the threshold, calculating an amount of assistance required for an electric hybrid traction motor to provide to a drivetrain of the vehicle to implement the received one or more operational parameters of the vehicle; and
         providing the amount of assistance to the drivetrain of the vehicle, thereby preventing the state change in the performance of the internal combustion engine, wherein the state change is activation of a subset of cylinders present in the internal combustion engine which are in a deactivated state.

7. The system of claim 6, wherein at least one of the one or more operational parameters represents a speed of the vehicle.

8. The system of claim 6, wherein at least one of the one or more operational parameters represents an acceleration of the vehicle.

9. The system of claim 6, wherein the data is received from one or more sensors located in the vehicle.

10. The system of claim 6, wherein the electric hybrid traction motor converts electrical power to mechanical power.

11. One or more computer readable non-transitory media storing instructions that are executable by a processing device, and upon such execution cause the processing device to perform operations comprising:

receiving data representative of one or more operational parameters for a vehicle;

calculating a fuel rate required for an internal combustion engine of the vehicle to respond to the one or more operational parameters;

determining if the required fuel rate exceeds a threshold which would cause a state change in performance of the internal combustion engine;

if the required fuel rate exceeds the threshold, calculating an amount of assistance required for an electric hybrid traction motor to provide to a drivetrain of the vehicle to implement the received one or more operational parameters of the vehicle; and providing the amount of assistance to the drivetrain of the vehicle, thereby preventing the state change in the performance of the internal combustion engine, wherein the state change is activation of a subset of cylinders present in the internal combustion engine which are in a deactivated state.

12. The media of claim 11, wherein at least one of the one or more operational parameters represents a speed of the vehicle.

13. The media of claim 11, wherein at least one of the one or more operational parameters represents an acceleration of the vehicle.

14. The media of claim 11, wherein the data is received from one or more sensors located in the vehicle.

15. The media of claim 11, wherein the electric hybrid traction motor converts electrical power to mechanical power.

* * * * *